(12) United States Patent
Holness et al.

(10) Patent No.: US 8,018,841 B2
(45) Date of Patent: Sep. 13, 2011

(54) INTERWORKING AN ETHERNET RING NETWORK AND AN ETHERNET NETWORK WITH TRAFFIC ENGINEERED TRUNKS

(75) Inventors: Marc Holness, Ottawa (CA); Abdullah Bashar, Ottawa (CA)

(73) Assignee: Ciena Corporation, Linthicum, MD (US)

( * ) Notice: Subject to any disclaimer, the term of this patent is extended or adjusted under 35 U.S.C. 154(b) by 87 days.

(21) Appl. No.: 12/344,362

(22) Filed: Dec. 26, 2008

(65) Prior Publication Data

US 2009/0168647 A1   Jul. 2, 2009

Related U.S. Application Data

(60) Provisional application No. 61/009,720, filed on Dec. 31, 2007.

(51) Int. Cl.
*G06F 11/22* (2006.01)
(52) U.S. Cl. ........ 370/222; 370/216; 370/225; 370/228; 398/1; 398/2; 398/3; 398/4; 714/100; 714/1; 714/2
(58) Field of Classification Search .......... 370/216–228; 398/1–5; 714/100, 1–4.4
See application file for complete search history.

(56) References Cited

U.S. PATENT DOCUMENTS

| | | | | |
|---|---|---|---|---|
| 6,411,621 | B1 * | 6/2002 | Norton et al. | 370/394 |
| 2003/0002103 | A1 * | 1/2003 | Erfani et al. | 359/127 |
| 2003/0185149 | A1 * | 10/2003 | Daniell et al. | 370/217 |
| 2007/0076719 | A1 * | 4/2007 | Allan et al. | 370/392 |
| 2007/0086361 | A1 * | 4/2007 | Allan et al. | 370/254 |

FOREIGN PATENT DOCUMENTS

CA   2566005   11/2004

OTHER PUBLICATIONS

International Search Report from corresponding PCT application PCT/CA2008/002301.
G. Chirovolu, et al., "Issues and Approaches on Extending Ethernet Beyond LANs", IEEE Communicaitons Magazine, Mar. 2004, pp. 80-86.
M. Lasserre et al., "Virtual Private LAN Service (VPLS) Using Label Distribution Protocol (LDP) Signaling" (RFC 4762), Jan. 2007, pp. 1-31.
Applicants hereby notify the Examiner of related U.S. Appl. No. 12/344,355 which is referenced in paragraph 2 of the instant application.
International Search Report from corresponding PCT application PCT/CA2008/002300 which corresponds to related U.S. Appl. No. 12/344,355.

* cited by examiner

*Primary Examiner* — Hassan Kizou
*Assistant Examiner* — Charles C Jiang
(74) *Attorney, Agent, or Firm* — Christopher & Weisberg, P.A.

(57) ABSTRACT

Interworking an Ethernet Ring network with an Ethernet network with traffic engineered trunks (PBT network) enables traffic engineered trunks to be dual homed to the Ethernet ring network to enable for protection switching between active and backup trunk paths in the PBT network. In one embodiment, the active path will terminate at a first bridge node on the Ethernet ring network and the backup path will terminate at a second bridge node on the Ethernet ring network. Trunk state information is exchanged between the bridge nodes to enable the bridge nodes to determine which of the active and backup paths should be used to forward data on the trunk. Upon a change in trunk state, a flush message is transmitted on the Ethernet ring network to enable the nodes on the Ethernet ring network to relearn the path to the new responsible bridge node.

18 Claims, 3 Drawing Sheets

INTERWORKING AN ETHERNET RING NETWORK AND AN ETHERNET NETWORK WITH TRAFFIC ENGINEERED TRUNKS

CROSS-REFERENCE TO RELATED APPLICATIONS

This application claims priority to U.S. Provisional Patent Application No. 61/009,720, entitled Interworking An Ethernet Ring Network With An Ethernet Network With Traffic Engineered Trunks, filed Dec. 31, 2007, the content of which is hereby incorporated herein by reference.

This application is related to U.S. patent application Ser. No. 12/027,942, entitled Method And Apparatus For Controlling A Set Of Ethernet Nodes Interconnected To Form One Or More Closed Loops, filed Feb. 7, 2008, the content of which is hereby incorporated herein by reference. This application is also related to U.S. patent application Ser. No. 12/344,355 entitled Interworking An Ethernet Ring Network With a Spanning Tree Controlled Ethernet Network filed on even date herewith, which claims priority to U.S. Provisional Patent Application No. 61/009,629, filed Dec. 31, 2007, entitled Interworking An Ethernet Ring Network With A Spanning Tree Controlled Ethernet Network, the content of which is hereby incorporated herein by reference.

TECHNICAL FIELD

The present invention relates to Ethernet networks and, more particularly, to a method and apparatus for interworking an Ethernet Ring network with an Ethernet network with traffic engineered trunks.

BACKGROUND

Data communication networks may include various computers, servers, nodes, routers, switches, bridges, hubs, proxies, and other network devices coupled to and configured to pass data to one another. These devices will be referred to herein as "network elements." Data is communicated through the data communication network by passing protocol data units, such as Internet Protocol packets, Ethernet frames, data cells, segments, or other logical associations of bits/bytes of data, between the network elements by utilizing one or more communication links between the network elements. A particular protocol data unit may be handled by multiple network elements and cross multiple communication links as it travels between its source and its destination over the network.

The various network elements on the communication network communicate with each other using predefined sets of rules, referred to herein as protocols. Different protocols are used to govern different aspects of the communication, such as how signals should be formed for transmission between network elements, various aspects of what the protocol data units should look like, how protocol data units should be handled or routed through the network by the network elements, and how information associated with routing information should be exchanged between the network elements.

Ethernet is a well known networking protocol that has been defined by the Institute of Electrical and Electronics Engineers (IEEE) as standards 802.1 and 802.3. Conventionally, Ethernet has been used to implement networks in enterprises such as businesses and campuses, and other technologies have been used to transport network traffic over longer distances. As the Ethernet standards have evolved over time, Ethernet has become more viable as a long distance transport technology as well.

FIG. 1 shows several fields that have been added to the Ethernet standard over time. As shown in FIG. 1, the original Ethernet frame format specified by IEEE 802.1 includes a source address (C-SA) and a destination address (C-DA). IEEE 802.1Q added a Customer VLAN tag (C-Tag) which includes an Ethertype, Tag Control Information (TCI) information, and customer VLAN ID. IEEE 802.1ad added a provider VLAN tag (S-Tag), which also includes an Ethertype, TCI information, and subscriber VLAN ID. The C-Tag allows the customer to specify a VLAN, while the S-Tag allows the service provider to specify a VLAN on the service provider's network for the frame. These tags also allow the customer and subscriber to specify other aspects which are not relevant to an understanding of the contribution disclosed herein. When a network is implemented using 802.1ad it may be referred to as Q in Q encapsulation or Provider Bridging (PB). A domain implemented using this Ethernet standard will be referred to as a Provider Bridging (PB) domain.

The Ethernet standard has evolved to also allow for a second encapsulation process to take place as specified in IEEE 802.1ah. Specifically, an ingress network element to a service provider's network may encapsulate the original Ethernet frame with an outer MAC header including a destination address on the service provider's network (B-DA), a source address on the service provider's network (B-SA), a VLAN ID (B-VID) and a service instance tag (I-SID). The combination of the customer MAC addresses (C-SA and C-DA) and the I-SID are commonly referred to as the I-Tag. A domain implemented using this Ethernet standard will be referred to as a Provider Backbone Bridging (PBB) domain.

802.1Q, 802.1ad, and 802.1ah all use one or more spanning tree instances in the control plane to determine which links should be active and which should be blocked to prevent the formation of loops. An Ethernet network domain that implements one or more spanning trees on the control plane will be referred to herein as a spanning tree controlled Ethernet network domain.

Since a spanning tree requires all data to flow on particular selected links on the network, the network links that are part of the spanning tree may experience congestion. IEEE 802.1Qay was developed to allow traffic engineered paths to be defined on the network so that traffic could be forwarded over links not forming part of the spanning tree. IEEE 802.1Qay specifies a way for network elements on an Ethernet network domain to switch traffic based on the B-DA and B-VID rather than just forwarding the traffic according to the B-DA. The header of the frames forwarded on an Ethernet network established using this technology is not changed, but the manner in which the header information is used is changed, to allow forwarding to take place in a different manner. A network domain that forwards traffic using this forwarding paradigm will be referred to as Provider Backbone Trunking (PBT) network. PBT networks allow traffic engineered paths (trunks) to be established so that traffic can follow specified paths through the network rather than being required to follow the links that have been selected to be part of the spanning tree. The spanning tree is still used to forward control frames, however.

Network nodes may be logically or physically arranged many different ways. One common way to arrange or interconnect network elements is to interconnect them in a ring, for example as shown in FIG. 2. In the example shown in FIG. 2, the ring 20 includes nodes 12, which are interconnected by links 14. In the example shown in FIG. 2, each node has a pair of 802.3 MAC interfaces 16 and an 802.1 bridge relay 18. 802.3 is another protocol established by the IEEE to define the Ethernet link layer. A control entity 20 is used to allow the network elements to exchange routing information and other control information, and is used by the network element to control how the data plane handles the data on the network.

Ethernet Shared Protection Rings (E-SPRING) is a protocol designed to be used in Ethernet rings such as the ring of FIG. 2, and is defined as ITU-T SG15/Q9, G.8032. This protocol specifies how the nodes on the ring should handle unicast, multicast, and broadcast frames. It also specifies multiple service classes, failure handling, and other aspects of how traffic should be forwarded by nodes on the Ethernet ring. The manner in which an Ethernet ring operates is described in greater detail in U.S. patent application Ser. No. 12/027,942, entitled Method And Apparatus For Controlling A Set Of Ethernet Nodes Interconnected To Form One Or More Closed Loops, filed Feb. 7, 2008, the content of which is hereby incorporated herein by reference.

Ethernet rings are able to interconnect with an Ethernet network running a spanning tree or implementing traffic engineered paths if the networks are interconnected at a single node. Unfortunately, having the two networks interconnected at a single node creates a single point of failure since, if the node goes down, interconnectivity between the networks will be lost. Thus, it would be advantageous to allow the two networks to be connected by two or more nodes. Where a traffic engineered path is to connect to the Ethernet ring network, it similarly would be advantageous have the traffic engineered path implemented to include a primary path and a backup path, each of which is connected to the Ethernet ring network at a different location. Accordingly, since the two networks are running two different control planes (S-SPRING control plane in Ethernet ring network, and spanning tree in the other Ethernet network), it would be advantageous to provide a way to coordinate between the networks such that the ring network would know which of the paths associated with the traffic engineered trunk is active, and where the active path connects to the Ethernet ring network.

SUMMARY

A method for interworking an Ethernet Ring network with an Ethernet network with traffic engineered trunks (PBT network) enables traffic engineered trunks to be dual homed to the Ethernet ring network to enable for protection switching between active and backup trunk paths in the PBT network. In one embodiment, the active path will terminate at a first bridge node on the Ethernet ring network and the backup path will terminate at a second bridge node on the Ethernet ring network. Trunk state information is exchanged between the bridge nodes to enable the bridge nodes to determine which of the active and backup paths should be used to forward data on the trunk. Upon a change in trunk state that requires the data traffic to switch from one path to the other, a flush message is transmitted on the Ethernet ring network to enable the nodes on the Ethernet ring network to relearn the path to the new responsible bridge node.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

Network elements arranged in a closed loop network topology will be referred to herein as Ethernet Shared Protection Ring (E-SPRing) nodes. The control protocol used to control operation of the nodes on the closed loop will be referred to as E-SPRing.

Figure 1:
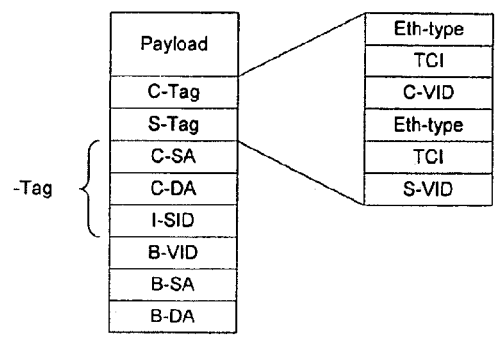
FIG. 1 is a functional block diagram of an Ethernet frame format.
Figure 2:
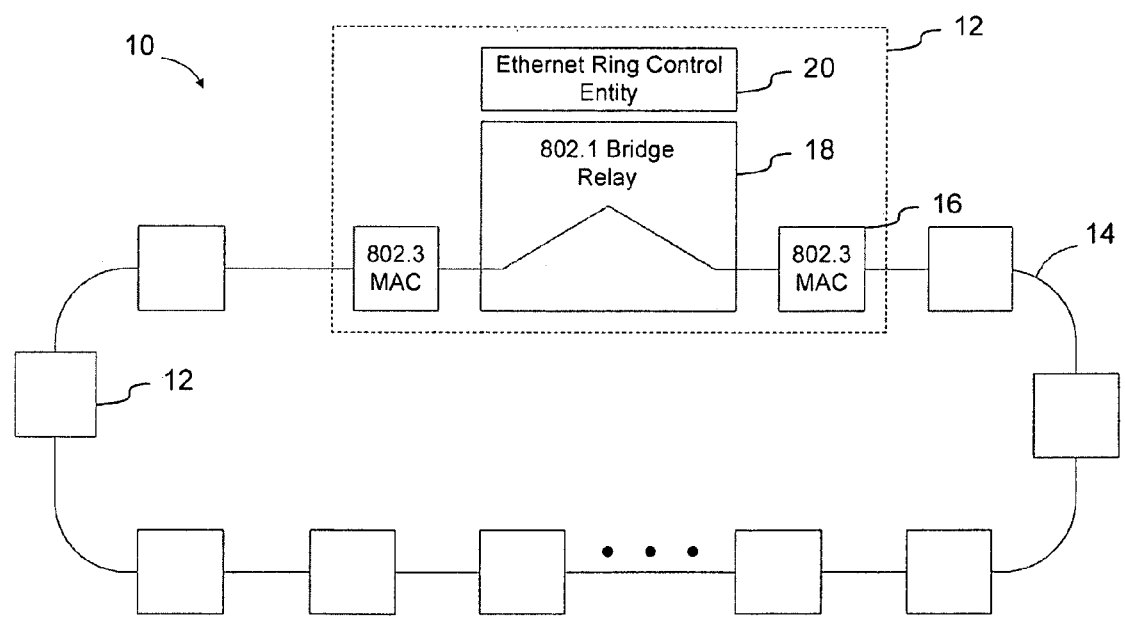
FIG. 2 is a functional block diagram of an example Ethernet ring network.

Closed loops such as the loop shown in FIG. 2 may exist in isolation or may exist as a logical ring within a larger mesh network. The techniques described herein may be used wherever a set of Ethernet nodes is interconnected logically or physically to construct a closed loop network topology. For example, in a communication network having a mesh configuration, it is possible to form a logical ring by selecting nodes 12 from the mesh that interconnect to form a closed loop network topology. An Ethernet Shared Protection Ring (E-SPRing) control instance may be run on any such logical or physical ring. Additionally, multiple control instances may be run on the same physical ring to form multiple ringlets on the physical/logical closed loop.

Implementation E-SPRing control protocol is described in greater detail in U.S. patent application Ser. No. 12/027,942, filed Feb. 7, 2008, the content of which is hereby incorporated by reference. Briefly, as described in greater detail therein, when Ethernet nodes that are interconnected in a closed loop architecture, the nodes may be allowed to collectively run a separate control plane to control how data is passed between the nodes on the ring. The control plane on the closed loop selects one of the nodes to be a root node to provide for blocking of traffic flowing on the ring. This prevents traffic from endlessly looping on the ring. Additionally, the control plane provides for failure detection on the closed loop, notification of the failure to the nodes on the closed loop, and how connectivity can be restored to enable the closed loop to recover from failure. One aspect of the control protocol is that, upon failure in the closed loop, a fault indication message will be transmitted on the ring. The fault indication message, amongst other things, causes the bridging nodes on the ring to flush their forwarding databases associated with the ring, so that the nodes can re-learn MAC addresses on the ring.

Where a network implementing a spanning tree and a closed loop network are connected with each other, each network will continue to implement its own control plane. Since the control plane of the network specifies how particular addresses are reachable on the network, where the two networks are connected at more than one place, the changes in one network may affect forwarding on the other connected network.

IEEE 802.1Qay allows traffic engineered paths to be created on an Ethernet network domain such that traffic will follow the traffic engineered paths rather than the paths forming part of the spanning tree. A network implemented using 802.1Qay will be referred to herein as Provider Backbone Bridging-Traffic Engineering (PBT) network. Although the spanning tree protocol is still used to flood control frames (Bridged Protocol Data Units), traffic on the network is not confined to follow the spanning tree. Conventionally, both a working path and a backup path will be created for a particular traffic engineered path (trunk group) so that traffic assigned to the trunk group may be switched from the active path to the backup path in the event of a failure on the network.

Figure 3:
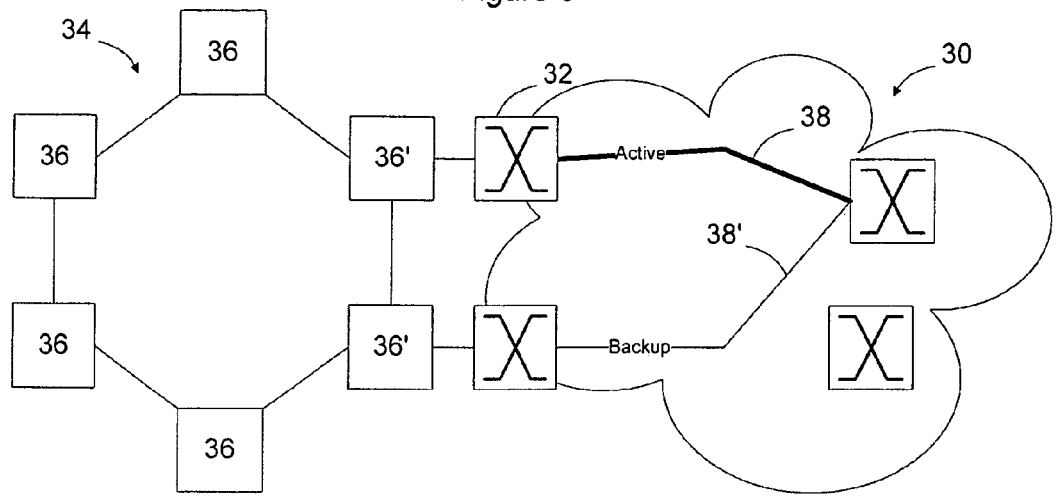
FIG. 3 is a functional block diagram of an Ethernet ring network dual homed to an Ethernet network with traffic engineered trunks.

A PBT network supports sub-50 ms protection switching by using Connectivity Fault Management messages such as connectivity check messages (CCMs) which are common Ethernet Operation Administration and Maintenance (OAM) messages. The ETH-CCMs are used to detect faults over established Ethernet switched paths through the PBT network and, when a fault is detected, the service flows may be redirected from the active Ethernet switched path to the backup Ethernet switched path.

Where a PBT network is to be connected to an Ethernet ring network by more than one node, the active and backup Ethernet switched path on the PBT network will likely connect to different bridging nodes. For example, FIG. 3 shows an example network in which a PBT Ethernet network domain 30 is connected to an Ethernet ring network 34. The PBT Ethernet network domain includes nodes 32 and the Ethernet ring network 34 includes nodes 36. To provide a resilient connection between the two network domains, two or more bridging nodes 36' on the ring network are connected to two or more nodes 32 on the network implementing the traffic engineering paths.

The PBT network will form engineered paths through the network referred to herein as trunks. Generally, each trunk will include both an active path 38 and a backup path 38'. The control plane of the PBT network may use RSVP-TE or another signaling/reservation protocol to signal the trunks. The invention is not limited by how the trunks are created on the PBT network.

Upon detection of a fault on the active path 38, traffic will switch to the backup path 38' if the backup path has a status of OK. As shown in FIG. 3, where the Ethernet ring network is dual homed to the PBT network via two bridge nodes 36', switching from the active path 38 to the backup path 38' will cause the traffic on the trunk to enter the Ethernet network 34 at a different point. This may affect how traffic is forwarded within the Ethernet ring network. Accordingly, enhancements to the Ethernet ring standard specified in ITU-T SG15/Q9 G.8032 would be desirable to support a dual homing solution between an Ethernet ring network and a Ethernet network with traffic engineered trunks.

The Ethernet ring control protocol should be decoupled from the PBT trunk protection control protocol, so that switching of the PBT trunk from active to backup does not affect the control plane of the Ethernet ring network. However, nodes 36 on the Ethernet ring network 34 that are sourcing traffic that is required to be transmitted on the PBT trunk must transmit traffic to the correct bridging node 36' that is supporting the currently active path of the PBT trunk. Stated another way, within the Ethernet ring network 34, it is important that the nodes 36 send traffic to the correct bridge node 36' so that the correct bridge node 36' is able to send the traffic on the active path when the active path is in use, or send the traffic on the backup path when the backup path is in use.

Figure 4:
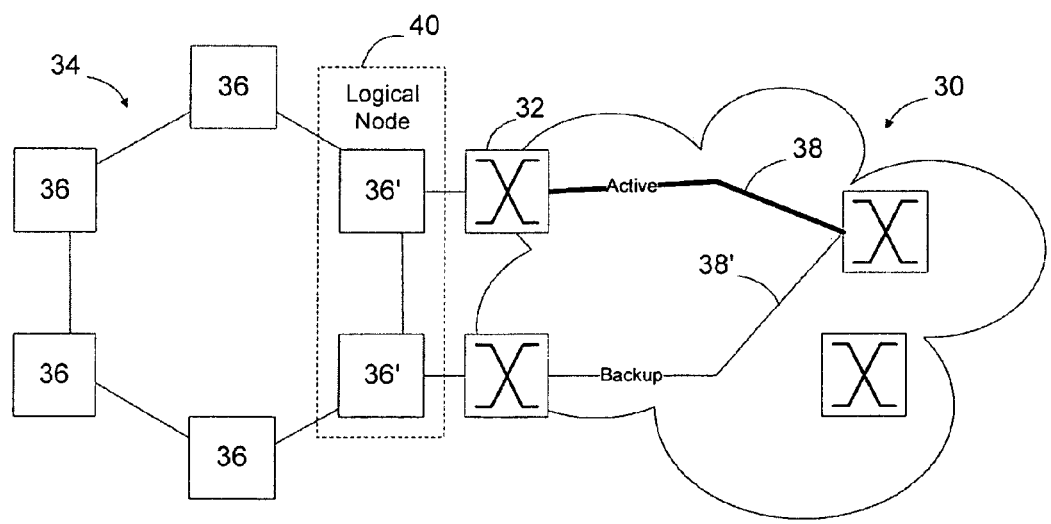
FIG. 4 is a functional block diagram showing the network of FIG. 3 with the two bridging nodes logically associated to emulate a single logical node according to an embodiment of the invention.

According to an embodiment of the invention, as shown in FIG. 4, the bridge nodes 36' are treated as a single logical node 40 interconnecting the Ethernet ring network and the PBT network. The bridge nodes 36' each run a PBT trunk protection state machine and share trunk protection group states (such as OK, Failure, [Local/Remote]) with each other. The bridge nodes may exchange PBT trunk state information with each other using link level Ethernet Connectivity Check messages. Alternatively, the bridge nodes may use other types of messages to exchange PBT trunk state information with each other. For example, the bridge nodes may use GMPLS to exchange the trunk state information, to thereby allow the same control plane that is used to signal establishment of the trunks to also enable the nodes to share information about the trunks with each other. Similarly, rather than using a standardized protocol or mechanism such as GMPLS or Ethernet CCMs, the nodes may use a proprietary protocol such as Nortel Networks' proprietary Shared Multi-Link Trunk (SMLT) protocol. Other message formats may be used as well and the invention is not limited to the use of a particular protocol in connection with exchanging PBT trunk protection group state information between the bridge nodes 36'.

Since the other nodes 36 on the Ethernet ring network will also need to forward traffic to the correct bridge node 36' servicing the branch of the PBT trunk that is currently in use, upon a state transition on the PBT trunk, the bridge nodes will cause the other nodes on the ring to flush their forwarding databases. For example, the bridge node that detects the PBT trunk failure may send a message on the ring to cause the ring nodes to flush their forwarding databases. Nodes 36 on the Ethernet ring network learn how to reach particular MAC addresses by the familiar process of MAC learning. Accordingly, causing the nodes 36 to flush their forwarding database in the event of a state change of an attached PBT trunk, enables the nodes 36 on the network to relearn the MAC addresses as being reachable via the alternate path. This allows the change in state to be propagated into the Ethernet ring network without requiring each of the nodes on the ring to have knowledge of the state of the PBT trunk.

One way to implement this process is to have the bridge nodes transmit a ring control Failure Indication Flush Only (Eth-FIFO) message when a PBT trunk transitions state from OK to Failure, or from Failure to OK. Upon receipt of an ETH-FIFO message, the nodes 36 will flush their forwarding database to allow them to re-learn MAC addresses associated with the PBT trunk.

Ethernet flush messages are implemented in the Ethernet ring control protocol and used in that protocol to enable the nodes to flush their forwarding databases upon failure on the ring or upon recovery from a failure on the ring. These same messages may be used to cause the nodes on the ring to flush their forwarding database upon change in PBT trunk state. Thus, the format of the flush message that is used on the ring as part of the control protocol may also be used to accommodate a change in tunnel state.

An Ethernet message to instruct the nodes on the Ethernet ring to flush their databases may be implemented by causing the Ethernet message to contain an OpCode that instructs the nodes on the Ethernet ring to flush their forwarding databases. Alternatively, the Ethernet message may contain a shared OpCode and other fields within the Ethernet message, such as the status field or request state may contain the instruction to the Ethernet nodes to flush their forwarding databases. The invention is not limited to the particular format of the Ethernet Flush message.

When an E-SPRing node receives an E-SPRing flush indication message, the node will flush (i.e., remove) all dynamic entries from its forwarding database associated with the ring. A node may be on multiple rings and, hence, the flush indication message may be ring specific. Flushing the forwarding database allows the node to relearn MAC addresses on the ring in view of the new configuration. Where multiple logical rings (ringlets) are implemented on a single physical ring, a change in state of the PBT trunk may impact all ringlets on the ring or only a subset of the ringlets on the ring. Thus, when the Forwarding Database (FDB) is flushed, the entries for all ringlets may be flushed or, alternatively, only the entries for the affected ringlets may be flushed. In another embodiment, when a trunk failure is detected and a protection switching message occurs, only entries associated with a given VID may be flushed from the FDB, or alternatively only selected entries within the VID may be flushed. Thus, depending on the configuration of the ring, different ways of flushing may be optimized to selectively retain information within the FDB that is not affected by the change in state of the PBT trunk.

Within the bridge nodes, the bridge nodes will each maintain a PBT trunk protection state machine 57. The PBT trunk protection state machine 57 contains trunk protection group state information 59 indicating whether the primary and secondary trunk paths 38, 38' are OK or have experienced failure. For example, the state of a trunk may be OK, local failure, and remote failure. If a bridge node 36' supports the primary trunk 38, and the state of the primary trunk is OK, then the bridge node supporting the primary trunk will transmit data frames over the primary trunk 38. If state of the primary trunk is not OK, the bridge node supporting the primary trunk will not transmit data frames over the primary trunk 38.

Similarly, if a bridge node supports the secondary trunk 38', then if the state of the primary trunk is FAILURE, and the state of the secondary trunk is OK, then the bridge node supporting the secondary trunk will transmit data frames over the secondary trunk. Otherwise, the bridge node supporting the secondary trunk will not transmit data frames over the secondary trunk.

Figure 5:
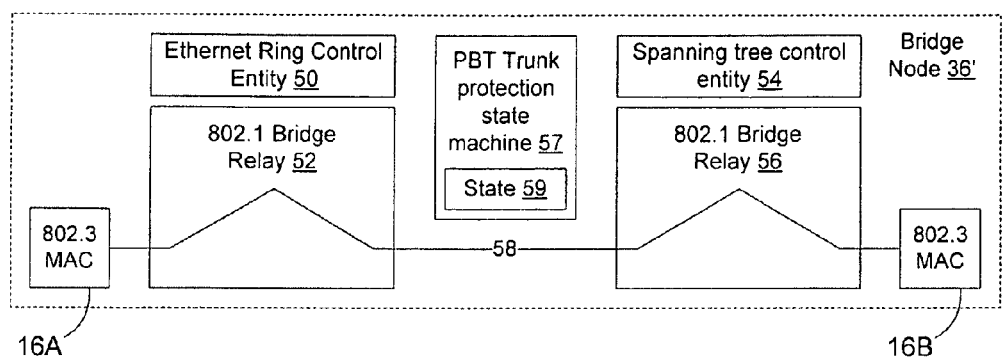
FIG. 5 is a functional block diagram of a bridge node that may be used to interconnect the Ethernet ring network and the Ethernet network with traffic engineered trunks.

FIG. 5 is a functional block diagram of a bridge node that may be used to interconnect the Ethernet ring network 34 and an Ethernet network 30 with traffic engineered trunks. As shown in FIG. 5, the bridge node 36' includes two or more 802.3 MAC interfaces 16A connected to links in the Ethernet Ring network. An Ethernet Ring Control entity 50 associated with a first 802.1 bridge relay 52 is provided to allow the bridge node to forward traffic on the Ethernet ring network and between the Ethernet ring network and the Ethernet network implementing PBT trunks 30. The Ethernet ring control entity 50 also participates in the Ethernet ring control plane and may take action on the Ethernet ring network, such as to generate and transmit Ethernet flush messages on the ring network. The Ethernet Ring Control entity 50 maintains the state machine 57 to enable the control entity to keep track of the state of the active and standby traffic engineered trunks.

The bridge node 36' further includes a control entity 54 associated with a second 802.1 bridge relay 56 to allow the bridge node to forward traffic on the Ethernet network implementing the traffic engineered trunks 30. A logical link 58 interconnects the two bridge relays 50, 56, to enable data to be forwarded between the two networks. A second set of 802.3 MAC interfaces 16B is connected to one or more links in the Ethernet network implementing the traffic engineered trunks. The spanning tree control entity 54 maintains the state of the trunks 59 in the PBT trunk protection state machine 57.

In operation, when a failure on the primary trunk occurs, the 802.3 MAC interface 16B will detect failure on the primary PBT trunk path. The change in state of the PBT trunk will be conveyed to the spanning tree control entity 54, which will notify the Ethernet ring control entity 50. The Ethernet ring control entity 50 will update the state in the state machine 57 and push the change in state to the other node 36' responsible for the associated backup PBT trunk path. Optionally, the spanning tree control entity 54 may update the state 59 directly in the PBT trunk protection state machine 57. The Ethernet ring control entity 50 will also generate an Ethernet FIFO message and pass the Ethernet FIFO message onto the Ethernet ring network via the 802.3 interface 16A, to cause the ring nodes to flush their forwarding databases and enable the nodes on the ring to relearn addresses associated with the PBT tunnel.

The functions described above may be implemented as a set of program instructions that are stored in a computer readable memory and executed on one or more processors on the computer platform. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method for interworking an Ethernet Ring network with an Ethernet network with traffic engineered trunks, at least one of the traffic engineered trunk groups having an active path extending through the Ethernet network and terminating at a first location on the Ethernet ring network and a backup path extending through the Ethernet network and terminating at a second location on the Ethernet ring network, the method comprising the steps of:

implementing two bridge nodes between the Ethernet ring network and the Ethernet network with traffic engineered trunks, a first of the bridge nodes terminating the active path of the traffic engineered trunk group and a second of the bridge nodes terminating the backup path of the traffic engineered trunk group;

exchanging trunk group protection state information between the two bridge nodes to allow the two bridge nodes to implement a single virtual bridge node between the Ethernet ring network and the Ethernet network with traffic engineered trunks; and generating a flush message on the Ethernet Ring to cause the nodes on the Ethernet ring to flush forwarding entries from their forwarding databases that are associated with the traffic engineered trunk group to enable the bridge nodes on the closed loop to relearn MAC addresses associated with the traffic engineered trunk group.

2. The method of claim 1, wherein the Ethernet Ring network includes a group of Ethernet nodes interconnected in a closed loop and running a separate control protocol, the separate control protocol being specific to the group of Ethernet nodes interconnected in the closed loop.

3. The method of claim 2, wherein the separate control protocol specifies a root node to perform ring blocking on the closed loop to prevent traffic from looping on the closed loop.

4. The method of claim 1, wherein the traffic engineered trunks are implemented as PBT trunks, and wherein the bridge nodes terminating the active path and backup path exchange the trunk group protection state information.

5. The method of claim 4, wherein the trunk group protection state information is exchanged using connectivity check messages (CCMs).

6. The method of claim 4, wherein the trunk group protection state information is exchanged using Generalized Multi Protocol Label Switching (GMPLS).

7. The method of claim 4, wherein the trunk group protection state information is exchanged using a proprietary protocol.

8. The method of claim 1, further comprising the step of transitioning from the active path to the backup path.

9. The method of claim 8, wherein, in connection with the step of transitioning from the active path to the backup path, the step of exchanging trunk group protection state information enables the bridge node terminating the active path to communicate to the bridge node terminating the backup path that the active path is down.

10. The method of claim 1, wherein the first of the bridge nodes terminating the active path of the traffic engineered trunk group will transmit data packets on the active path if a state of the active path is OK, and will not transmit data packets on the active path if the state of the active path is FAILURE.

11. The method of claim 10, wherein the second of the bridge nodes terminating the backup path of the traffic engineered trunk group will transmit data packets on the backup path if the state of the active path is FAILURE and a state of the backup path is OK.

12. The method of claim 11, wherein the second of the bridge nodes terminating the backup path of the traffic engineered trunk group will not transmit data packets on the backup path if the state of the active path is OK or if the state of the backup path is FAILURE.

13. A network, comprising:
a closed loop of at least three Ethernet nodes running an Ethernet ring control protocol, the Ethernet ring control protocol specifying at least one of the nodes as a root node for controlling traffic on the closed loop;
a first of the Ethernet nodes being attached to an active path of a traffic engineered trunk group on an Ethernet domain supporting traffic engineered trunks;
a second of the Ethernet nodes being attached to a backup path of the traffic engineered trunk on the Ethernet domain supporting traffic engineered trunks, such that the first and second Ethernet nodes provide a dual homed connection between the closed loop of Ethernet nodes and the Ethernet domain supporting the traffic engineered trunks;
wherein the first and second Ethernet nodes exchange trunk group protection state information between them to enable coordinated failover from the active path of the traffic engineered trunk group to the backup path of the traffic engineered trunk group; and
wherein if responsibility for transmission of data packets changes from the first of the Ethernet nodes to the second of the Ethernet nodes, or from the second of the Ethernet nodes to the first of the Ethernet nodes, then transmitting a flush indication message on the closed loop of Ethernet nodes to cause the Ethernet nodes on the closed loop to flush forwarding entries from their forwarding databases to enable the Ethernet nodes to relearn MAC addresses associated with the trunk group.

14. The network of claim 13, wherein the closed loop is a logical loop of Ethernet nodes in a mesh network.

15. The network of claim 13, wherein the first of the Ethernet nodes terminating the active path of the traffic engineered trunk group will transmit data packets on the active path if a state of the active path is OK, and will not transmit data packets on the active path if the state of the active path is FAILURE.

16. The network of claim 15, wherein the second of the Ethernet nodes terminating the backup path of the traffic engineered trunk group will transmit data packets on the backup path if the state of the active path is FAILURE and a state of the backup path is OK.

17. The network of claim 16, wherein the second of the Ethernet nodes terminating the backup path of the traffic engineered trunk group will not transmit data packets on the backup path if the state of the active path is OK or if the state of the backup path is FAILURE.

18. The network of claim 13, wherein the trunk group protection state information is one of OK, local failure, and remote failure.

* * * * *